March 19, 1963 R. AUBERT ETAL 3,082,376

FREQUENCY MODULATED RADIO LINKS WITH SUPERREGENERATIVE REPEATERS

Filed Jan. 25, 1960 2 Sheets-Sheet 2

United States Patent Office 3,082,376
Patented Mar. 19, 1963

3,082,376
FREQUENCY MODULATED RADIO LINKS WITH SUPERREGENERATIVE REPEATERS

Roger Aubert and Michel Blaise, Paris, France, assignors to Compagnie Generale de Telegraphie Sans Fil, a corporation of France Filed Jan. 25, 1960, Ser. No. 4,351
Claims priority, application France Feb. 20, 1959
4 Claims. (Cl. 325—7)

The present invention relates to a new radio link system.

A radio link system, according to the invention, comprises a frequency modulated terminal transmitter and relays or repeaters including super-regenerative amplifiers. The terminal receivers may also comprise a super-regenerative amplifier stage, similar to that of the relays. In contradistinction to conventional frequency modulated radio link systems, there is no demodulation and remodulation at the repeaters in a radio link system according to the invention.

The invention will be best understood from the following specification and appended drawing, wherein.

In all the figures, the same reference numerals designate similar elements.

Figures 1, 2:
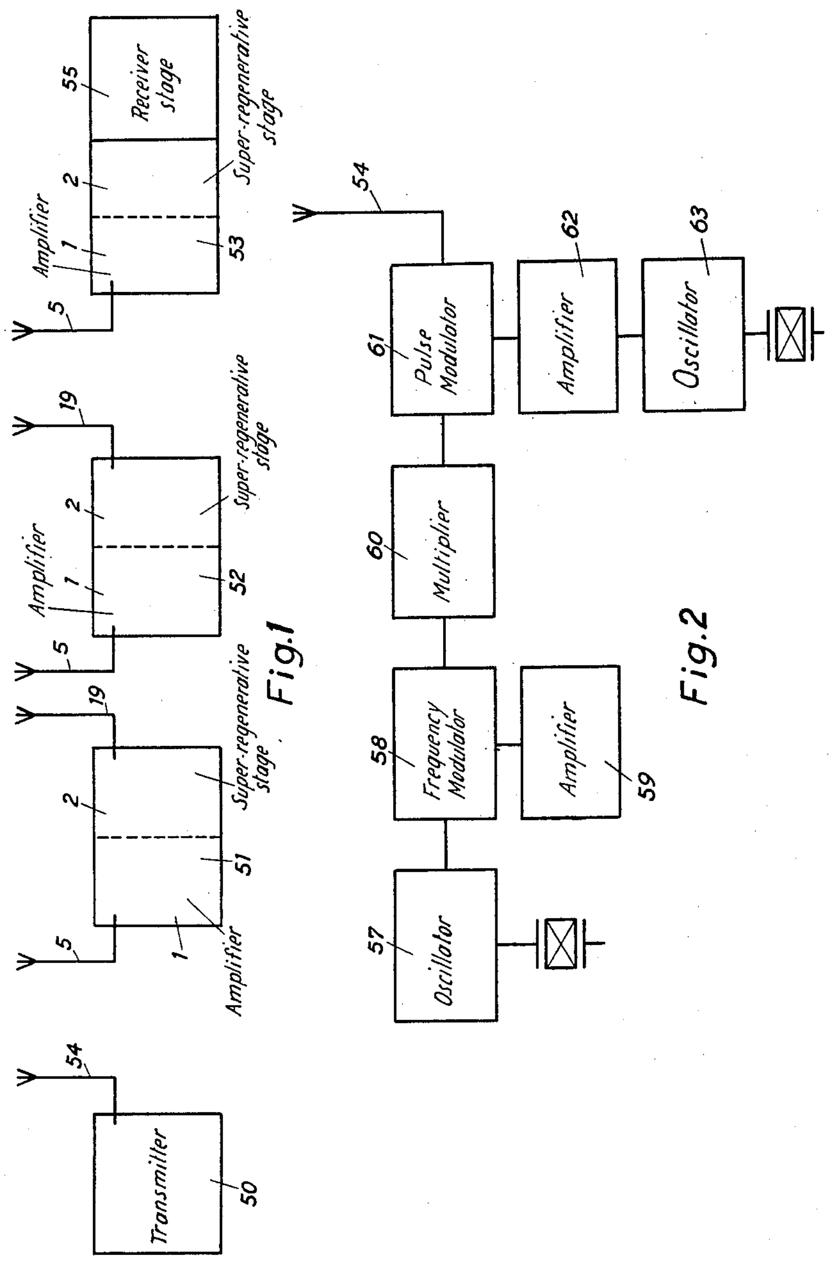
FIG. 1 is a block diagram of a radio link system according to the invention.
FIG. 2 is a block diagram of a terminal transmitter.

Referring to the embodiment illustrated in FIG. 1, a radio link according to the invention may comprise: a transmitter station 50 having a directive aerial 54; a number of repeaters, for example two, 51 and 52, each comprising a receiver aerial 5, a radio frequency amplifier stage 1, a super-regenerative stage 2 and a directive re-transmission aerial 19; and a receiver station 53, comprising a receiver aerial 5, a radio frequency amplifier stage 1, a super-regenerative stage 2 and the usual receiver circuits, i.e. a frequency converter stage, an intermediate frequency amplifier stage and the low frequency stages including a discriminator. Transmitter 50 is frequency modulated and may also be pulse modulated at the quenching frequency of the super-regenerative stages 2.

Before describing the operation of the system shown in FIG. 1, the operation of super-regenerative amplifiers will be briefly recalled, more particularly as applied to frequency modulated signals.

As is well known, if a super-regenerative circuit is operated without insertion of any initial voltage, the starting of the circuit being determined only by its own noise, wave trains W will appear in accordance with the equation:

$$W=A(t)e^{j(2\pi f_1 t+\varphi(t))}$$

wherein, $A(t)$ is the amplitude of the envelope of the wave train varying at the quenching frequency $F=1/T$ between zero and a maximum value;

$f_1$ is the natural frequency of the circuit;

$\varphi(t)$ is a random variable, which has a constant value during each wave train but whose value depends on the starting instant of each wave train, this instant being a random variable.

If now a radio frequency signal having a frequency $f_2$ is applied to the circuit, for controlling the starting instant of the wave trains in lieu of the noise, it controls by its own phase the phase of the wave trains W.

It can be shown that the frequency spectrum of W then contains a number of discrete components at the respective frequencies:

$$f_2, f_2 \pm F \ldots f_2 \pm nF$$

frequency $f_1$ having completely disappeared from this spectrum.

If $f_2$ is frequency modulated by a signal whose spectral components equal to or higher than $$\frac{F}{2}$$

have a negligible amplitude, the frequencies of the spectrum follow the instantaneous frequency deviations of frequency $f_2$. The information contained in the frequency modulation of signal $f_2$ can then be collected by filtering any one of the thus generated frequency bands of the spectrum, the center frequencies of which differ by F, and can be detected by means of a discriminator comprised in the terminal receiver.

In the example illustrated in FIG. 1, the frequency modulated transmitter 50 transmits a continuous frequency-modulated signal. This signal is received at the repeater station 51, is amplified in amplifying stage 1 of this station and controls the operation of the super-regenerative stage 2 thereof which includes a quenched oscillator, the initial phase of the wave trains W during each active period of which is thus determined by the incoming signals. Repeater 51 re-transmits through aerial 19 wave trains whose phase includes the information contained in the incoming signals.

The quenching frequency of the second repeater 52, and the same is true for further repeaters, if any, must be the same as that of repeater 51. This is readily achieved by self quenching. As to the receiver stage 55, it comprises, as already mentioned, a frequency discriminator and a narrow band filter centered on the desired frequency of the above considered spectrum of discrete frequencies.

A further and preferred embodiment of the terminal transmitter is shown in FIG. 2. In this case the frequency modulated wave is pulsed. The transmitter of FIG. 2 comprises a quartz-controlled oscillator stage 57, the output of which is frequency modulated by a modulator 58. Modulator 58 is also coupled to a low frequency amplifier stage 59 and to a multiplier 60. Another chain comprising a quartz controlled oscillator 63 and an amplifier 62 provides for the pulse modulation of the signal at 61, before the same is radiated by aerial 54.

Quartz controlled oscillator 57 may operate, for example, at a frequency of 8 mc., multiplier 60 raising this frequency to 168 mc.

Chain 63—61 of the transmitter chops the frequency modulated signal into pulses the repetition frequency of which should be higher than twice the highest frequency to be transmitted, for example 100 kc.

Figure 3:
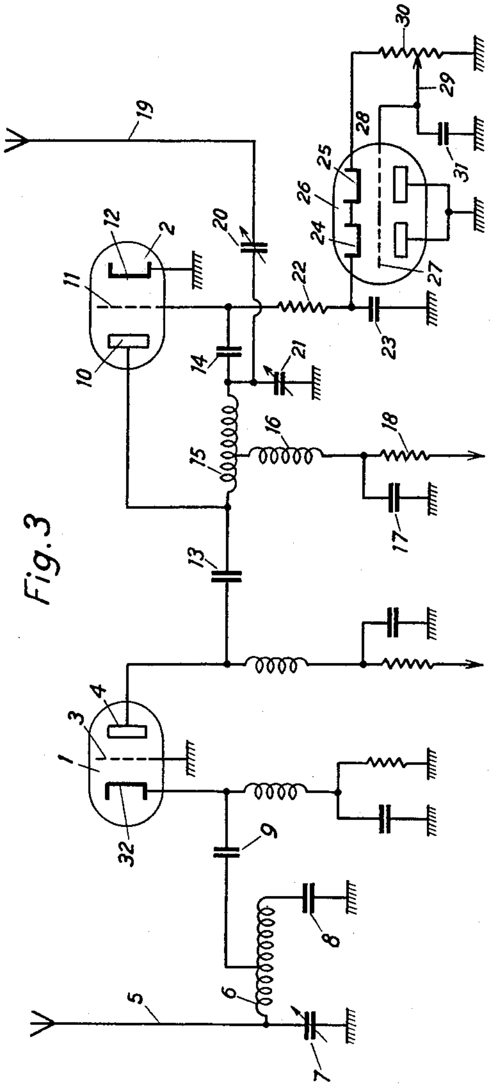
FIG. 3 shows in more detail one embodiment of a relay station according to the invention.

FIG. 3 shows in more detail a repeater station including a self quenching superregenerative oscillator for the reception of signals constituted by wave trains. The amplifier stage comprises a triode 1 having a cathode 32, a grid 3 and a plate 4. A receiver aerial 5 is connected to cathode 32 by means of an impedance matching circuit including an inductance coil 6, the ends of which are grounded through two tuning adjustable capacitors 7 and 8, and of a coupling capacitor 9. Grid 3 is also grounded. Plate 4 is connected to plate 10 of a triode 2 forming the super-regenerative stage, through a capacitor 13. Triode 2 also comprises a grid 11 and a grounded cathode 12. Grid 11 is connected to plate 10 through a capacitor 14 and an inductance coil 15 provided with a tap, in the circuit of which there is a high frequency choke coil 16 whose free end is connected to ground through condenser 17 and, to a high voltage source (not shown) through a resistance 18. The junction point of inductance 15 and condenser 14 is connected to ground through an adjustable condenser 21 and to aerial 19 through a variable condenser 20. Grid 11 of triode 2 is, on the other hand, connected to ground through a resistance 22 and a decoupling capacitor 23, their junction point being connected to series-connected cathodes 24 and 25 of a double-triode 26 whose anodes are grounded, grids 27 and 28 being connected to a sliding contact 29 of a potentiometer, the resistor 30 of which is inserted in series between ground and cathode 25, the contact being grounded through a capacitor 31.

The signal received is amplified by amplifier 1 which may be of the pencil tube type. The quenching frequency of the super-regenerative stage 2 is the same as the repetition frequency of the pulse modulated signal transmitted by transmitter 50, for example 100 kc. with a duty cycle of about 10%.

Double triode 26 may be used for compensating for D.C. voltage variations. An increase of the high voltage which may cause a change in the quenching frequency, also increases the grid current which brings about a variation of the inner resistance of the double triode and corrects the quenching frequency.

Thus, whether the initial frequency modulated signals are also pulse modulated or not, the repeaters which follow repeater 1 will receive wave trains. The operation and the structure of all these repeaters is the same.

Figure 4:
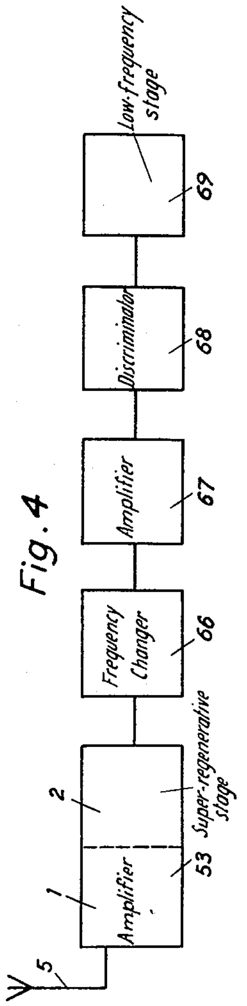
FIG. 4 is a block diagram of a terminal receiver.

A terminal receiver station is very diagrammatically shown in FIG. 4. In addition to stages 1 and 2 this station comprises a frequency changer stage 66, an intermediate frequency amplifier stage 67, which filters the desired frequency band of the spectrum, a discriminator 68 serving as a demodulator and conventional low frequency stages 69. A conventional narrow band frequency modulated receiver could also be used.

The tests effected have been fully successful. They were carried out at a frequency of 168 mc. The operation remains stable when the input level at the repeaters varies by 40 db's with a simultaneous variation of the high voltage supply by ±10%. The aerials 19 may be advantageously coupled through unidirectional ferrite couplers. The attenuation between the consecutive repeaters may reach 95 db in the stability conditions indicated, for an average power output at the super-regenerative stage 2, of about 50 mw. With a quenching frequency of 100 kc. the modulation frequency may be of the order of 20 kc., with an excursion of ± 20 kc. Under these conditions, at the terminal receiver an intermediate frequency filter could be used showing the following selectivity characteristics: total band of 50 kc. at 3 db 200 kc. at 50 db.

Further tests have been made at a frequency of 960 mc., 24 transmission channels being provided.

It is to be understood that the invention is in no way limited to the embodiments described and illustrated which were given only by way of example.

What is claimed is:

1. A radio link system comprising:

a terminal transmitter comprising means for transmitting a continuous wave which is frequency modulated by an information signal; a first repeater including: means for receiving said continuous wave; a superregenerative oscillator quenched at a predetermined frequency; means for controlling the high frequency phase of the wave trains delivered by said superregenerative oscillator by means of said continuous wave, the frequency spectrum of said wave trains being consequently constituted by frequency bands, the center frequencies of which are separated by frequency intervals equal to said predetermined frequency, and each of which contains said information; and means for radiating said wave trains;

*n* other repeaters, *n* being any positive integer, each of said other repeaters comprising: means for receiving said wave trains from the preceding repeater; a self quenching superregenerative oscillator having a quench frequency substantially equal to said predetermined frequency; means for controlling the high frequency phase of the regenerated wave trains delivered by said self quenching oscillator by means of said wave trains received from the preceding repeater; and means for radiating said regenerated wave trains; and a terminal receiver comprising: means for receiving said wave trains transmitted by the last repeater; means for filtering one of said frequency bands; and frequency discriminating means for deriving therefrom said information.

2. A radio link system comprising:

a terminal transmitter comprising: means for frequency modulating a carrier wave by an information signal and for additionally pulse modulating said frequency modulated carrier wave, to derive therefrom high frequency pulses having a fixed repetition frequency; and means for radiating said high frequency pulses;

a first repeater including: means for receiving said high frequency pulses, a self quenching superregenerative oscillator having a quench frequency equal to said repetition frequency; means for controlling the high frequency phase of the wave trains delivered by said self quenching superregenerative oscillator by means of said high frequency pulses, the frequency spectrum of said wave trains being consequently constituted by frequency bands, the center frequencies of which are separated by frequency intervals equal to said predetermined frequency, and each of which contains said information; and means for radiating said wave trains;

*n* other repeaters, *n* being any positive integer, each of said other repeaters comprising means for receiving said wave trains from the preceding repeater; a self quenching superregenerative oscillator having a quench frequency substantially equal to said repetition frequency; means for controlling the high frequency phase of the regenerated wave trains delivered by said self quenching oscillator by means of said wave trains received from the preceding repeater; and means for radiating said regenerated wave trains;

and a terminal receiver comprising: means for receiving said wave trains transmitted by the last repeater; means for filtering one of said frequency bands; and frequency discriminating means for deriving therefrom said information.

3. A radio link system comprising:

a terminal transmitter for transmitting first signals wherein an information is contained in the angle modulation of a high frequency oscillation;

a first repeater comprising: means for receiving said first signals; a superregenerative oscillator operating at a predetermined quench frequency; means for controlling the high frequency phase of the wave trains delivered by said superregenerative oscillator by means of said first signal, the frequency spectrum of said wave trains being consequently constituted by frequency bands, the center frequency of which are separated by frequency intervals equal to said predetermined frequency, and each of which contains said information; and means for radiating said wave trains;

*n* other repeaters, *n* being any positive integer, each of said other repeaters comprising means for receiving wave trains from the preceding repeater; a self quenching superregenerative oscillator having a quench frequency substantially equal to said predetermined frequency, means for controlling the high frequency phase of the regenerated wave trains delivered by said self quenching oscillator by means of said wave trains received from the preceding repeater; and means for radiating said regenerated wave trains;

and a terminal receiver comprising: means for receiving said regenerated wave trains transmitted by the last repeater, means for filtering one of said frequency bands, and means for deriving said information from said filtered frequency band.

4. A radio link system as claimed in claim 3, wherein said terminal receiver comprises a high frequency amplifying stage constituted by a self quenching oscillator having a quench frequency equal to said predetermined frequency; means for controlling the phase of the wave trains delivered by self quenching oscillator by means of said regenerated wave trains received from the last repeater, and wherein said filtering means for filtering said frequency band operate at an intermediate frequency.

References Cited in the file of this patent

UNITED STATES PATENTS

| | | |
|---|---|---|
| 2,044,061 | Crawford | June 16, 1936 |
| 2,262,838 | Deloraine et al. | Nov. 18, 1941 |
| 2,273,090 | Crosby | Feb. 17, 1942 |
| 2,520,136 | Earp | Aug. 29, 1950 |
| 2,566,882 | Goldman | Sept. 9, 1951 |
| 2,576,495 | Good | Nov. 27, 1951 |